Dec. 26, 1939.   G. H. HUTAFF, JR   2,185,084
LICENSE PLATE HOLDER
Filed March 2, 1939   2 Sheets-Sheet 1

Inventor
GEORGE H. HUTAFF, JR.

By Milans & Milans
Attorneys

Dec. 26, 1939.  G. H. HUTAFF, JR  2,185,084
LICENSE PLATE HOLDER
Filed March 2, 1939  2 Sheets-Sheet 2
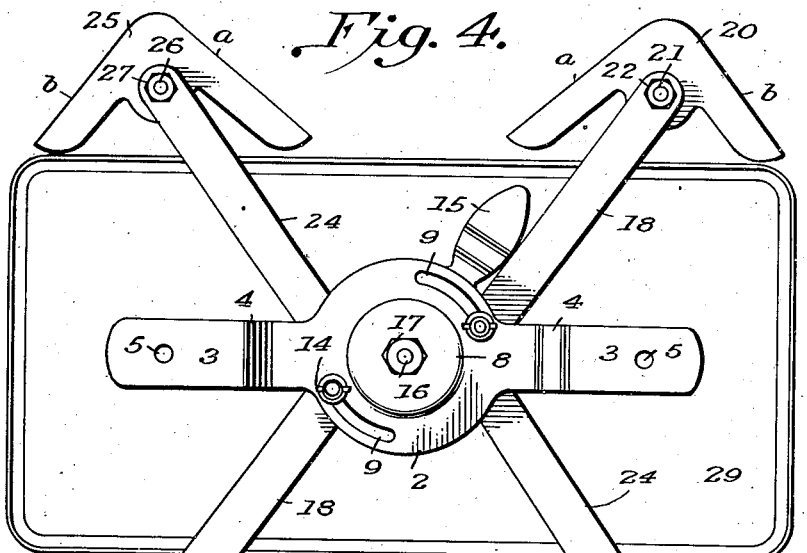
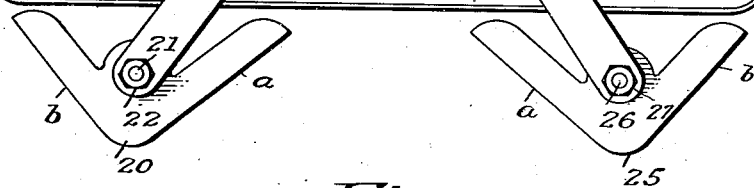
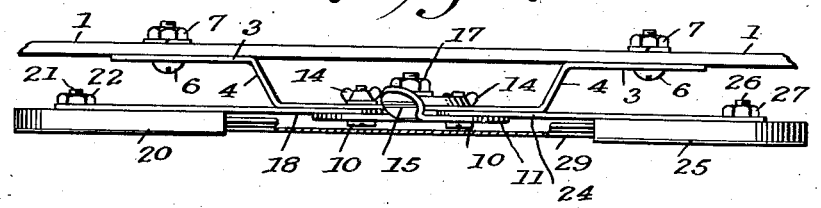
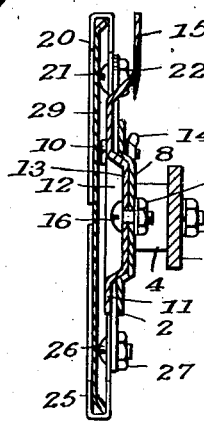
Inventor
GEORGE H. HUTAFF, JR.
By Milans & Milans
Attorneys Patented Dec. 26, 1939

2,185,084

UNITED STATES PATENT OFFICE 2,185,084

LICENSE PLATE HOLDER

George H. Hutaff, Jr., Wilmington, N. C.

Application March 2, 1939, Serial No. 259,476

4 Claims. (Cl. 40—125)

My invention relates to new and useful improvements in license plate holder and has for its principal object the provision of a device of this character in which the license plate may be positioned in and held by the holder without the necessity of passing bolts or similar fastening members through the plate, the holder including channel members adapted to engage the corners of the plate, these channel members being drawn into tight engagement with the corners of the plate or released therefrom by means of a rotatable member having a handle portion for manipulation thereof.

Another object of the invention consists in the provision of a license plate holder of the character described including means for securing the operating member in holding position or releasing the same for manipulation when it is desired to remove the license plate or to restore the same in the holder.

With the above and other objects in view, which will appear as the description proceeds, my invention consists in the novel details of construction, and arrangement of parts, described in the following specification and claims and illustrated in the accompanying drawings, and while I have illustrated and described the preferred embodiments of the invention, as they now appear to me, it will be understood that such changes may be made as will fall within the scope of the appended claims.

In the drawings:

Fig. 4 is a rear elevation of the license plate holder and plate, the holding members being shown in released position relative to the plate.

Fig. 5 is a top plan with an edge portion of the license plate broken away.

Fig. 6 is a section on the line 6—6 of Fig. 2 looking in the direction of the arrows.

Fig. 7 is a section on the line 7—7 of Fig. 2; and

Fig. 8 is a section on the line 8—8 of Fig. 2.

It is well-known that considerable trouble has been experienced in the past in securing license plates to automobiles or similar vehicles where it has been necessary to pass bolts through the license plate and where nuts have been placed upon the bolts. Ordinarily license plates are only attached to or removed from a vehicle at extended intervals and the nuts and bolts will naturally rust due to exposure to the weather and it necessitates considerable labor in removing the nuts from the bolts and then the bolts from the license plate. All this is overcome in my improved form of license plate holder wherein it is not necessary to pass any bolts or similar fastening members directly through the license plate, corner members being provided for engaging the corners of the license plate and these corner members being operated to either move them into tight engagement with the plate or out of engagement therewith. Many automobile license plates are now manufactured with openings therein to receive securing bolts and my improved form of holder is equally well adapted for use with such formed plates or with plates in which no openings are provided.

Figure 3:
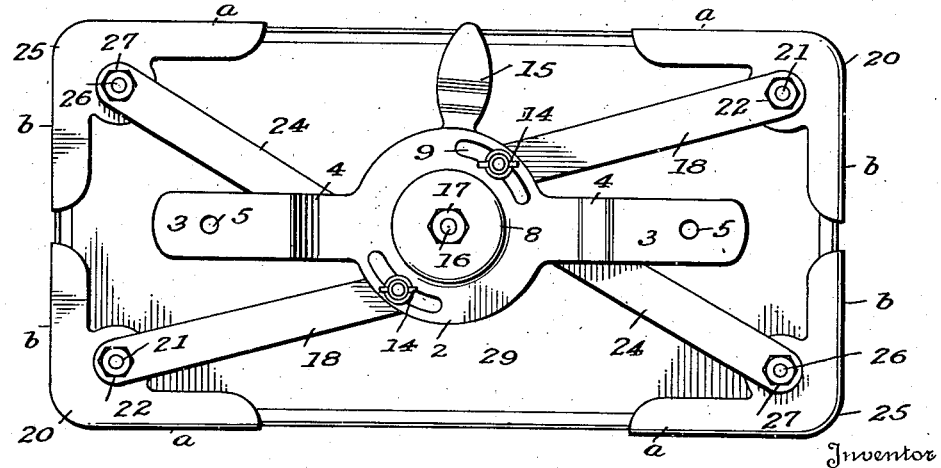
Fig. 3 is a rear elevation of the license plate holder with the plate in position.

In the drawings 1 indicates a bar forming a part of a bracket which is secured to the desired part of the automobile or other vehicle. My improved form of license plate holder, which is adapted to be secured to this bar 1, includes a plate 2 having the oppositely directed arms 3 offset from the plate at 4. Each of the arms is provided with an opening 5 to receive a bolt or screw 6, these bolts or screws passing through openings in the bar 1 of the supporting bracket and receiving the nuts 7, as shown quite clearly in Figs. 5 and 6 of the drawings. The plate 2 is formed with a depression in what might be termed its front face to provide the rearwardly directed circular projection shown at 8 and the purpose of which will be later brought out. The plate 2 is provided adjacent its edge with the oppositely disposed arcuate slots 9, as shown more clearly in Figs. 3 and 4 of the drawings, and operable in these slots are the bolts 10 which are carried by the rotatable plate or member 11 having the depressed portion 12 forming the circular projection 13 which is adapted to be received and operable in the depression formed in the plate 2, this arrangement and positioning being shown more clearly in Figs. 6, 7 and 8 of the drawings. A wing nut 14 is received on each of the bolts 10 and when adjusted holds the plate or rotatable member 11 against rotation relative to the plate 2. When the wing nuts are loosened the plate or member 11 may be rotated relative to the plate 2, a handle 15 being formed on the plate or member 11 for engagement by the operator. The plates 2 and 11 are secured together against facewise movement by means of the bolt or screw 16 and nut 17, but of course, it will be understood that the connection is not sufficiently tight to prevent rotation of the plate 11 relative to the plate 2.

Pivotally connected to the plate or rotatable member 11, by means of the bolts 10, are the inner ends of the bars 18, the opposite ends of the bars being pivotally connected to what might be termed the corner members 20, by means of the screws or bolts 21 and the nuts 22. Pivotally connected to the plate or rotatable member 11, by means of the struck-out projections 23, are the inner ends of the bars 24, the opposite ends of the bars being pivotally connected to the corner members 25, by means of the bolts or screws 26 and the nuts 27. It will be noted that the inner ends of each of the bars 18 and 24 are received between the plates 2 and 11 and the plate 2 covers the ends of the struck-out projections 23, as shown more particularly in Fig. 8 of the drawings, and thereby prevents disengagement of the inner ends of the bars 24 from said projections. It will be further noted that each of the pivotal connections of the inner ends of the bars 18 and 24 are off-center with respect to the pivot bolt 16 thereby permitting the bars to be drawn inwardly or forced outwardly, with their respective corner members, when the plate 11 is rotated, the bars 18 and 24 extending at an angle from the plate or rotatable member 11 to its respective corner member.

Figure 2:
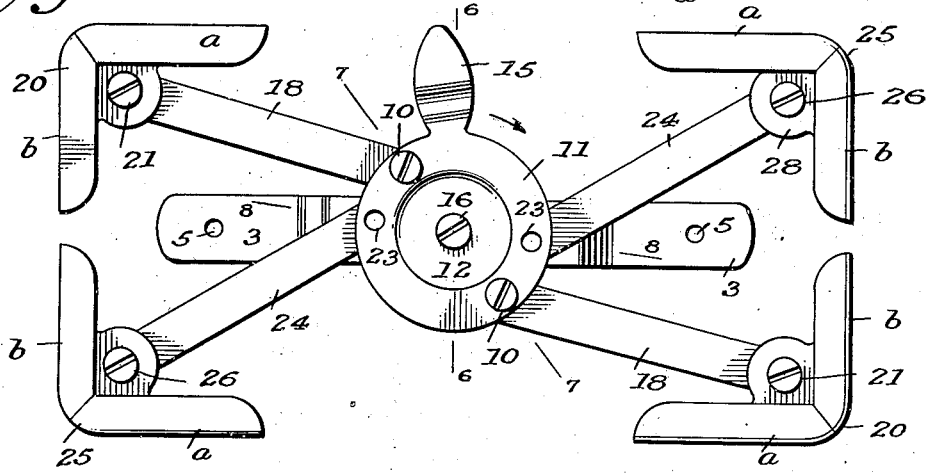
Fig. 2 is a front elevation of the license plate holder with the plate removed.

The corner members 20 and 25 are of angular channel formation, each including the arms *a* and *b*. Formed integral with the rear walls of each of the arms, at the point where the arms meet, as shown more particularly in Figs. 2 and 3 of the drawings, is an ear 28 to which the outer ends of the arms 18 and 24 are pivotally connected by means of the screws or bolts 21 and 26.

The license plate, to be supported by my improved form of holder, is shown at 29, and while shown as being formed with a flanged edge and without openings, may be of other formations desired.

Figure 1:
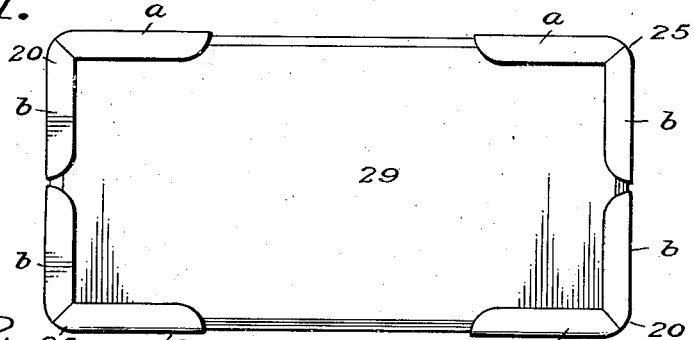
Fig. 1 is a front elevation showing the license plate in position in the holder.

From the above detailed description it is thought that the construction will be clearly understood and that the operation will be apparent. When the license plate is in position the corners thereof are received in the corner members 20 and 25, as shown quite clearly in Figs. 1 and 3 of the drawings, and the corner members are drawn into tight engagement with the corners of the license plate by rotating the plate or member 11 in the direction of the arrow in Fig. 2 or in other words towards the right. The plate or member is rotated by grasping the handle 15, it being understood that for this purpose of rotating the wing nuts 14 will be loosened on the bolts or screws 10. With the plate rotated into the position shown in Figs. 2 and 3 of the drawings to tightly engage the corners of the license plate, the wing nuts will be tightened to hold the corner members in their clamping engagement. As the plate 11 is rotated in the direction shown by the arrow in Fig. 2 the bars 18 and 24 will be drawn inwardly to in turn draw the corners members inwardly. When it is desired to remove the license plate the plate or member 11 will be rotated in the opposite direction to that described for clamping, it being understood that before such rotation can take place that the wing nuts 14 must be loosened. This movement forces the bars 18 and 24 outwardly to disengage the corner members 20 and 25 from the corners of the license plate and said corner members with their connecting bars are then swung into the position shown in Fig. 4 of the drawings to release the license plate and permit its easy removal. Rotation of the plate or member 11, relative to the plate 2, is permitted by the movement of the bolts or screws 10 in the arcuate-shaped openings 9 of the plate 2. It will thus be seen that I have provided a novel form of holder in which the license plate may be positioned and held without the necessity of positioning any bolts or similar fastening members directly through the plate.

Having fully described my invention what I claim as new and desire to secure by Letters Patent is:

1. A license plate holder including a support, a plate rotatably mounted on the support, corner members adapted to engage the corners of the license plate, bars pivotally connected at one end to a corner member and at the opposite end to the rotatable plate, and means engageable for operating the rotatable plate to position the corner members in clamping or unclamping positions.

2. A license plate holder including a support, a plate, means for rotatably mounting the plate on the support, members adapted to engage the corners of the license plate, bars pivotally connected at one end to a corner member and at the opposite end to the rotatable plate, the pivotal connections between the bars and the plate being off-center with respect to the means rotatably mounting the plate on the support, and means engageable for rotating the plate to position the corner members in clamping or unclamping positions.

3. A license plate holder including a support having elongated openings therein, a plate rotatably mounted on the support, members carried by the plate and operable in the elongated openings of the support, corner members adapted to engage the corners of the license plate, bars pivotally connected at one end to a corner member and at the opposite end to the rotatable plate, the members carried by the rotatable plate and operable in the elongated openings of the support forming the pivotal connections between certain of the bars and the rotatable plate, means engageable for operating the rotatable plate to position the corner members in clamping or unclamping positions, and means carried by the members operable in the elongated openings of the support for holding the rotatable plate in its adjusted positions.

4. A license plate holder including a support, a plate rotatably mounted on the support, corner members adapted to engage the corners of the license plate, and means connecting the corner members and rotatable plate to cause movement of the corner members towards or away from the corners of the license plate on rotation of the rotatable plate in opposite directions, the corner members being adapted for swinging movement relative to the rotatable plate, independent of the first-mentioned movements, when the corner members are disengaged from the license plate.

GEORGE H. HUTAFF, Jr.